United States Patent Office 2,944,561
Patented July 12, 1960

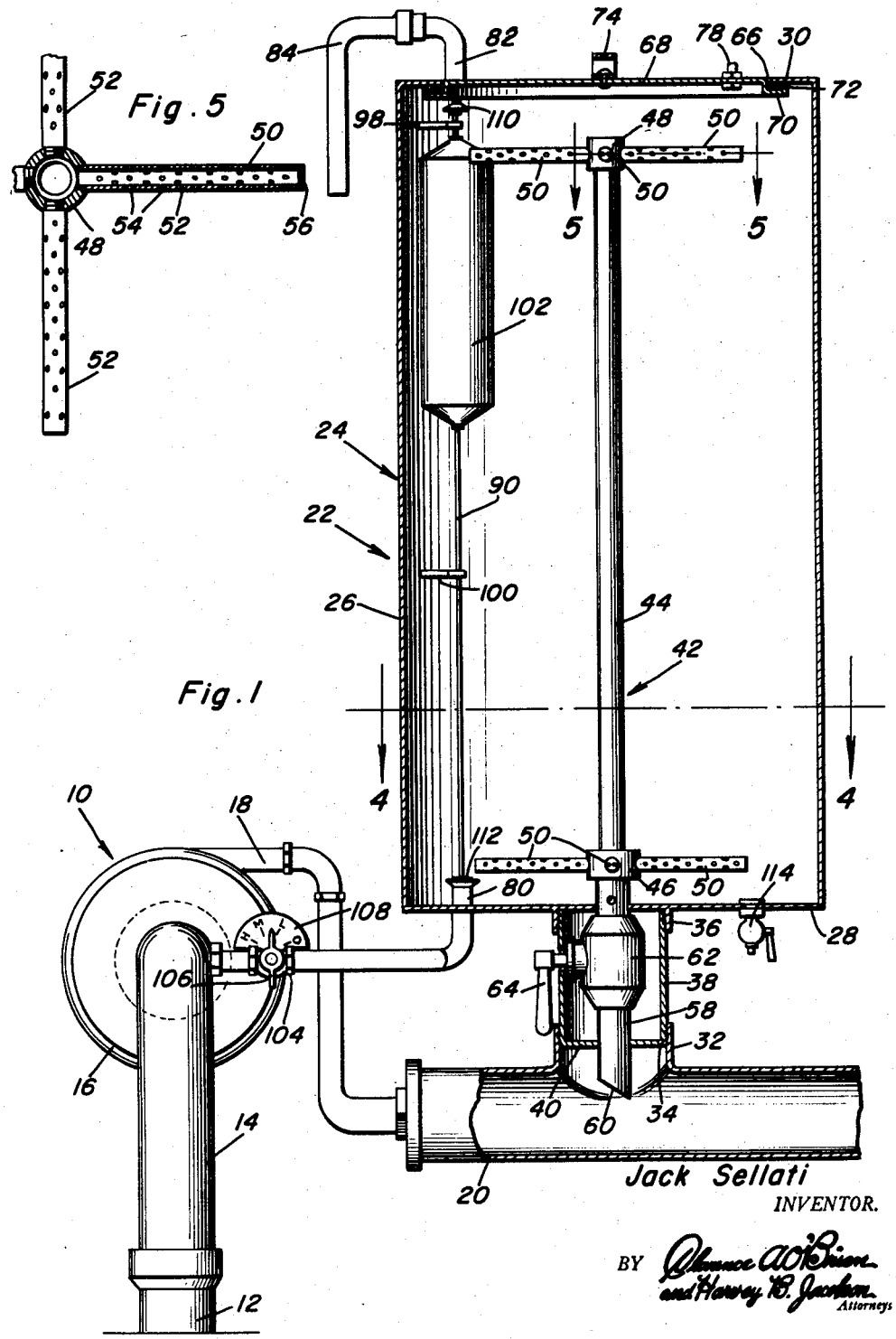

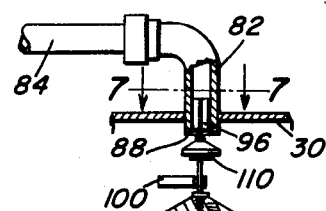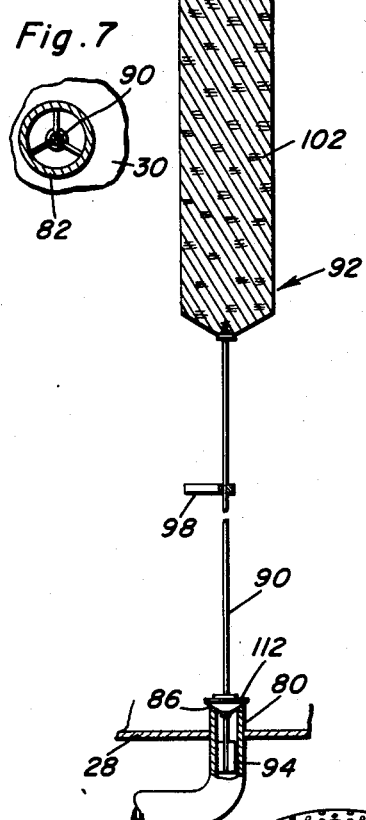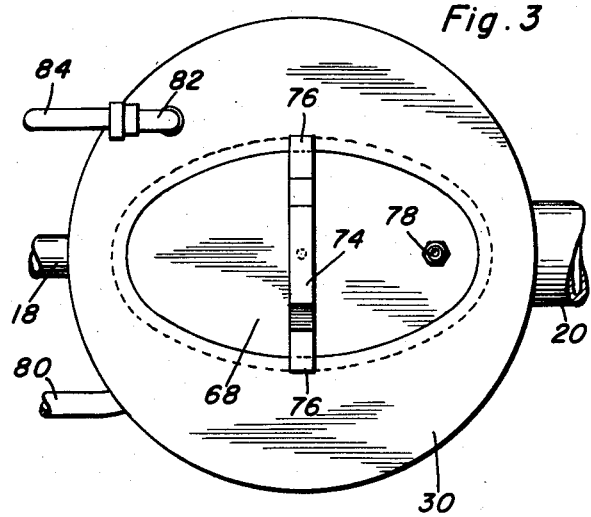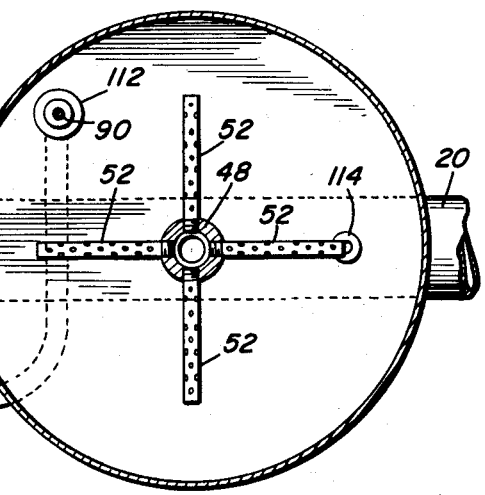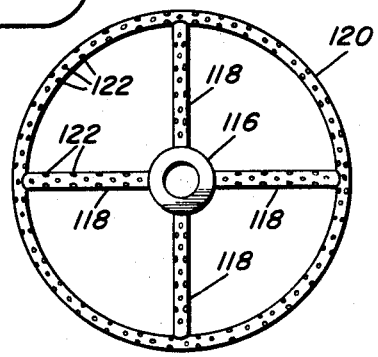
Jack Sellati
INVENTOR.

2,944,561

LAWN SPRINKLER SYSTEM ATTACHMENT

Jack Sellati, 105 NW. 64th Court, Miami, Fla.

Filed Sept. 21, 1956, Ser. No. 611,169

8 Claims. (Cl. 137—268)

This invention relates in general to new and useful improvements in lawn sprinkler system attachments, and more specifically to an attachment for supplying fertilizer and the like to sprinkling water.

The primary object of this invention is to provide an improved attachment for lawn sprinkler systems, the attachment being of such a nature whereby dry fertilizer or similar material may be placed in a supply tank and may be proportionally distributed into the water of the sprinkler system at any desired rate.

Another object of this invention is to provide an improved attachment for lawn sprinkler systems, the attachment including a supply tank in which a dry fertilizer or similar material is placed, there being positioned within the supply tank a suitable spray head to assure the proper spraying of the water and the dissolving of the dry fertilizer therein so the properly proportioned fertilizer and water mix is made available at all times.

Still another object of this invention is to provide an improved lawn sprinkler system which includes a fertilizer adding attachment, the attachment being connected to a discharge line of a pipe for the purpose of receiving mixing water therefrom and being provided with an outlet pipe connected to the intake pipe of the pump so that the water from the attachment carrying fertilizer and the like is recirculated through the pump to insure the proper mixing with the water which is being supplied to the sprinkler system.

A further object of this invention is to provide a supply tank for distributing fertilizer and the like into a lawn sprinkler system, the supply tank being provided with an outlet pipe and a vent pipe, the two pipes being aligned and having a single valve assembly controlling the flow therethrough whereby the vent pipe is opened to the atmosphere until a sufficient amount of water is within the supply tank after which the vent pipe is closed and the outlet pipe is open to permit the fertilizer-water mixture to flow from the supply tank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the pump portion of a lawn sprinkler system and shows attached thereto the attachment which is the subject of this invention, the attachment being shown in vertical section and a portion of the manifold of the lawn sprinkler system being broken away and shown in section for purposes of clarity;

Figure 2 is an enlarged fragmentary sectional view taken through the supply tank of the attachment of Figure 1 and shows the specific details of the valve assembly for controlling flow through an outlet pipe and the vent pipe of the supply tank;

Figure 3 is a plan view of the attachment of Figure 1 and shows the details of a cover plate for the top wall of the supply tank;

Figure 4 is a transverse vertical sectional view taken substantially upon the plane indicated by the section line 4—4 of Figure 1 and shows the details of spray nozzles of a lower end of a spray head disposed within the supply tank;

Figure 5 is an enlarged fragmentary sectional view taken substantially upon the plane indicated by section line 5—5 of Figure 1 and shows further the details of one of the spray nozzles;

Figure 6 is a plan view of the modified form of spray nozzle; and

Figure 7 is a fragmentary sectional view taken substantially upon the plane indicated by the section line 7—7 of Figure 2 and shows the relationship of the lower part of the vent pipe with a fin-type guide which is carried by a valve stem of the valve assembly.

Referring now to the drawings in detail, it will be seen that there is illustrated in Figure 1 a portion of the lawn sprinkler system which is referred to in general by the numeral 10. The lawn sprinkler system 10 will include a stand pipe 12 from a well or the like to which there is connected an intake pipe 14 of a pump 16. The pump 16 is illustrated as being a centrifugal pump and is the preferred type although other types may be used. Connected to the pump 16 is a discharge line 18 which is in turn connected to a manifold 20. Although it has not been illustrated, there will be connected to the manifold 20 a distribution system which is also a vital part of the lawn sprinkler system 10, but not a part of the present invention.

Connected as part of the lawn sprinkler system 10 is a mixing attachment, which is the subject of this invention, the mixing attachment being referred to in general by the reference numeral 22. The mixing attachment 22 includes a supply tank which is referred to in general by the reference numeral 24. The supply tank 24 is formed of a cylindrical body portion 26, a bottom wall 28 and a top wall 30.

The supply tank 24 may be mounted in any desired manner. However, it is shown as being mounted on the manifold 20. In order that the supply tank 24 may be mounted on the manifold 20, there is provided on the manifold 20 intermediate the ends thereof an upstanding fitting 32 which is internally threaded as at 34. Also, there is secured to the bottom wall 28 of the supply tank 24 in depending relation an internally threaded collar 36. Extending between the collar 36 and the sleeve 32 is a support fitting 38. The support fitting 38 is threadedly engaged with both the fitting 32 and the collar 36 to removably secure the supply tank 24 in place. The support fitting 38 also includes a bottom wall 40 for the purpose of sealing the fitting 32.

Disposed within the supply tank 24 is a spray head referred to by the reference numeral 42. The spray head 42 includes a supply pipe 44 which is provided adjacent its lower end with a distributing fitting 46. A similar distributing fitting 48 is mounted on the upper end of the supply pipe 44. Extending outwardly from the distributing fittings 46 and 48 in radiating relation is a plurality of spray nozzles 50. The spray nozzles 50 are preferably in the form of elongated lengths of pipe 52 having spray openings 54 formed therein about their circumference. The pipes 52 have closed ends 56 remote from the distributing fittings 46 and 48 and, if desired, the end 56 of each pipe 52 may be provided with outlet openings 54.

Extending through the bottom wall 28 of the supply tank 24 and the bottom wall 40 in sealed relation is an inlet pipe 58. The inlet pipe 58 is connected to the supply pipe 44 of the spray head 42 for supplying water thereto. The lower end of the inlet pipe 58 is beveled as at 60 to insure the proper flow of water from the manifold 20 into the supply tank 22. A valve is mounted in the inlet pipe 58 intermediate its ends, the valve being of the shut-off type and being referred to by the reference numerals 62. The valve 62 includes a readily accessible control handle 64.

In order that fertilizer or other powdered materials to be dispensed by the lawn sprinkler system 10 may be placed in the supply tank 24, the top wall 30 is provided with a filler opening 66. The filler opening 66 is closed by a cover plate 68 which has a peripheral portion 70 normally disposed within the supply tank 24 and being held in sealed relation against the top wall 30 by the pressure within the supply tank 24. A gasket 72 is provided to increase the seal. The cover plate 68 also includes a handle 74 which has end portions 76 overlying the top wall 30 to insure the initial seating of the cover plate 68. If desired, the cover plate 68 may be provided with a small vent 78.

The bottom wall 28 of the supply tank 24 is provided with an outlet pipe 80. Also, the top wall 30 of the supply tank 24 is provided with a vent pipe 82. The vent pipe 82 is provided with an extension 84 and the outlet pipe 80 is connected to the intake pipe 14 and the pump 16.

Referring now to Figure 2 in particular, it will be seen that the outlet pipe 80 and the vent pipe 82 are disposed in opposed aligned relation. The outlet pipe 80 includes a valve seat 86 which is opposed to the valve seat 88 of the vent pipe 82. Extending between the outlet pipe 80 and the vent pipe 82 is an elongated valve stem 90 which is part of the valve mechanism 92. The valve stem 90 is provided at the lower end thereof with a fin-shaped guide 94 guidedly disposed within the upper part of the outlet pipe 80. A similar fin guide 96 is mounted on the upper end of the valve stem 90 and is guidedly engaged in the lower portion of the vent pipe 82.

Extending inwardly from the body portion 26 of the supply tank 24 are suitable guide brackets 98 and 100. The guide brackets 98 and 100 engage intermediate portions of the valve stem 90 and prevent flexing thereof by pressure which may be exerted thereon by the dry fertilizer and the like disposed in the supply tank 24. Mounted on the valve stem 90 intermediate the guide brackets 98 and 100 is a float member 102.

In order that the flow of the fertilizer-water mixture from the supply tank 24 into the intake pipe 14 may be controlled, there is provided intermediate the ends of the outlet pipe 80 a control valve 104. The control valve 104 is provided with a readily accessible handle 106 which has associated therewith a dial 108 to indicate the amount of flow from the supply tank 24 into the pump 16.

In the normal operation of the attachment 22, the supply tank 24 is provided with the desired quantity of powdered fertilizer or like material. Then the valve 62 is moved to an open position. At this time water is supplied to the interior of the supply tank 24 and air therein escapes through the vent pipe 82. After sufficient water has entered into the supply tank 24, the float 102 will move upwardly so as to close the vent pipe 82. This is accomplished by a valve member 110 mounted on the upper portion of the valve stem 90. As the valve stem 90 moves upwardly, a valve member 112, normally seated on the valve seat 86 enclosing the outlet pipe 80 will move upwardly and open the outlet pipe 80. The valve 104 is then set at the desired position and fertilizer-water mixture is then supplied to the intake pipe 14 at the desired rate. The water-fertilizer mixture enters into the pump 16 with the intake water and is thoroughly mixed therewith so that the water entering into the manifold 20 is properly proportioned with the fertilizer. If desired, the bottom wall 28 of the supply tank 24 may be provided with a drain attachment 114. The drain attachment 114 is preferably in the form of a small petcock type drain.

Referring now to Figure 6 in particular, it will be seen that there is illustrated a modified form of spray nozzle. The spray nozzle of Figure 6 includes a distributing fitting 116 which is similar to the distributing fittings 46 and 48 and which will be connected to a supply pipe, such as the supply pipe 44. Radiating from the distributing fitting 116 are pipes 118 which have their outer ends connected to a ring-like pipe 120. The pipes 118 and 120 are provided with outlet openings 122 to insure the proper spraying of water into the powdered material which may be disposed in the supply tank 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a lawn sprinkler system for adding fertilizer and the like to sprinkling water, said attachment comprising a supply tank having a removable cover to facilitate the insertion of fertilizer, an inlet pipe and an outlet pipe extending into said supply tank, a spray head within said supply tank for distributing water throughout said supply tank, said spray head being connected to said inlet pipe, a vent pipe on an upper part of said supply tank, said vent pipe being aligned with said outlet pipe, a single valve assembly controlling flow through said outlet pipe and said vent pipe.

2. An attachment for a lawn sprinkler system for adding fertilizer and the like to sprinkling water, said attachment comprising a supply tank having a removable cover to facilitate the insertion of fertilizer, an inlet pipe and an outlet pipe extending into said supply tank, a spray head within said supply tank for distributing water throughout said supply tank, said spray head being connected to said inlet pipe, a vent pipe on an upper part of said supply tank, said vent pipe being axially aligned with said outlet pipe, a single valve assembly controlling flow through said outlet pipe and said vent pipe, said outlet pipe and said vent pipe having opposed valve seats, an elongated valve stem extending between said outlet pipe and said vent pipe, valve members positioned on said valve stem adjacent opposite ends thereof, said valve members being spaced apart a distance less than the distance between said valve seats whereby only one of said outlet pipes and said vent pipe is closed at a time.

3. An attachment for a lawn sprinkler system for adding fertilizer and the like to sprinkling water, said attachment comprising a supply tank having a removable cover to facilitate the insertion of fertilizer, an inlet pipe and an outlet pipe extending into said supply tank, a spray head within said supply tank for distributing water throughout said supply tank, said spray head being connected to said inlet pipe, a vent pipe on an upper part of said supply tank, said vent pipe being axially aligned with said outlet pipe, a single valve assembly controlling flow through said outlet pipe and said vent pipe, said outlet pipe and said vent pipe having opposed valve seats, an elongated valve stem extending between said outlet pipe and said vent pipe, valve members positioned on said valve stem adjacent opposite ends thereof, said valve members being spaced apart a distance less than the distance between said valve seats whereby only one of said outlet pipes and said vent pipe is closed at a time, a float control member mounted on said valve stems intermediate said valve members.

4. In combination with a sprinkler system of the type including a pump having an intake pipe and a discharge pipe, an attachment for adding fertilizer and the like to sprinkling water, said attachment comprising a supply tank, an inlet pipe secured to said supply tank and extending therein, a fitting on said discharge pipe connecting said inlet pipe to said discharge pipe for receiving water therefrom, a spray head within said supply tank, said spray head being connected to said inlet pipe in communication therewith for receiving water therefrom, said supply tank having a lower portion, an outlet pipe connected to the lower portion of said supply tank and extending therein, a fitting on said intake pipe connecting said outlet pipe to said intake pipe in communication therewith, said outlet pipe having a vertically disposed terminal portion within said supply tank terminating in a valve seat, and a control valve for said outlet pipe, said control valve including a valve rod, guide means carried by said supply tank and engaged with said valve rod for guiding said valve rod, said valve rod being aligned with said valve seat, a valve member secured to said valve rod and normally seated on said valve seat to close said outlet pipe, and a float secured to said valve rod for moving said valve member out of engagement with said valve seat when sufficient water is within said supply tank to assure proper operation of the attachment.

5. The combination of claim 4 wherein said discharge pipe fitting also constitutes a support for said supply tank.

6. The attachment of claim 1 wherein said inlet pipe is provided with a valve, the inlet pipe valve cooperating with said single valve assembly to control the flow of water through said supply tank.

7. The attachment of claim 2 wherein said inlet pipe is provided with a valve, the inlet pipe valve cooperating with said single valve assembly to control the flow of water through said supply tank.

8. The attachment of claim 3 wherein said inlet pipe is provided with a valve, the inlet pipe valve cooperating with said single valve assembly to control the flow of water through said supply tank.

References Cited in the file of this patent

UNITED STATES PATENTS

| | | |
|---|---|---|
| 577,068 | Quinn | Feb. 16, 1897 |
| 1,152,769 | Trent | Sept. 7, 1915 |
| 1,823,582 | Bartels | Sept. 15, 1931 |
| 1,895,084 | Peltier | Jan. 24, 1933 |
| 1,932,693 | Goodloe | Oct. 31, 1933 |
| 2,489,461 | Parrish | Nov. 29, 1949 |